United States Patent
Eckstein

(10) Patent No.: US 10,379,929 B2
(45) Date of Patent: Aug. 13, 2019

(54) ENHANCED DIAGNOSTIC AND REMEDIATION SYSTEM

(71) Applicant: Microsoft Technology Licensing, LLC, Redmond, WA (US)

(72) Inventor: Matthew Eckstein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/383,667

(22) Filed: Dec. 19, 2016

(65) Prior Publication Data

US 2018/0173584 A1    Jun. 21, 2018

(51) Int. Cl.
G06F 11/07    (2006.01)

(52) U.S. Cl.
CPC ...... *G06F 11/0769* (2013.01); *G06F 11/0751* (2013.01); *G06F 11/0775* (2013.01)

(58) Field of Classification Search
CPC ............ G06F 11/0709; G06F 11/0751; G06F 11/0769; G06F 11/0775; G06F 16/3329
USPC ..................................................... 714/57, 26
See application file for complete search history.

(56) References Cited

U.S. PATENT DOCUMENTS

| | | | |
|---|---|---|---|
| 7,409,595 B2* | 8/2008 | Nissan-Messing | G06F 11/2294 714/26 |
| 7,506,195 B2* | 3/2009 | Takahashi | G06F 11/0709 707/999.202 |
| 7,757,126 B2* | 7/2010 | Vidiyala | G06F 11/0748 714/26 |
| 9,026,856 B2* | 5/2015 | Hecox | G06F 11/0793 714/38.1 |
| 9,690,644 B2* | 6/2017 | Anderson | G06F 11/079 |
| 10,116,596 B2* | 10/2018 | Li | H04L 51/02 |
| 2002/0069189 A1 | 6/2002 | Bertrand et al. | |
| 2002/0123983 A1* | 9/2002 | Riley | G06Q 10/00 |
| 2004/0049565 A1 | 3/2004 | Keller et al. | |
| 2008/0068217 A1 | 3/2008 | Van wyk et al. | |
| 2010/0031095 A1* | 2/2010 | Ruan | G06Q 10/06 714/57 |
| 2012/0221558 A1* | 8/2012 | Byrne | G06F 17/30864 707/723 |
| 2013/0007538 A1 | 1/2013 | Gupta et al. | |

(Continued)

OTHER PUBLICATIONS

Evko, Tim, "From Alert to Post-mortem: How to Manage an Outage with VictorOps", https://www.sitepoint.com/alert-post-mortem-manage-outage-victorops/, Published on: Mar. 19, 2015, 3 pages.

(Continued)

*Primary Examiner* — Joseph R Kudirka

(57) ABSTRACT

Aspects of systems and methods for providing an enhanced diagnostic and remediation system are discussed herein. The enhanced diagnostic and remediation system enables a user to monitor a computing system/framework for interruptions or other issues that impact the accessibility of the computing system/framework. When an interruption occurs at the monitored computing system/framework, the enhanced diagnostic and remediation system sends an alert communication to the user. In response, the user communicates with the enhanced diagnostic and remediation system to diagnose and remediate the interruption. Thus, the user is able to efficiently address the interruption that impacts accessibility of the computing system/framework.

20 Claims, 9 Drawing Sheets

(56) References Cited

U.S. PATENT DOCUMENTS

| | | | |
|---|---|---|---|
| 2013/0018895 A1* | 1/2013 | Harless | G10L 15/1822 |
| | | | 707/748 |
| 2013/0145205 A1 | 6/2013 | Lee | |
| 2015/0063556 A1 | 3/2015 | Uba et al. | |
| 2015/0142704 A1 | 5/2015 | London | |
| 2018/0121808 A1* | 5/2018 | Ramakrishna | G06N 5/02 |

OTHER PUBLICATIONS

Hasan, Upal, "How to use machine learning to debug outages 10x faster", https://medium.com/@upal/how-to-use-machine-learning-to-debug-outages-10x-faster-e480b7e2a907, Published on: Jun. 14, 2016, 15 pages.

Gubenko et al., "Auto-remediation: making an Openstack cloud self-healing", https://www.mirantis.com/blog/auto-remediation-making-an-openstack-cloud-self-healing/, Published on: Oct. 12, 2016, 6 pages.

Stephen Burton, "Reducing Production Incidents and Outages with Machine Learning", https://www.linkedin.com/pulse/reducing-production-incidents-outages-machine-learning-stephen-burton, Published on: Nov. 15, 2015, 44 pages.

* cited by examiner

ENHANCED DIAGNOSTIC AND REMEDIATION SYSTEM

BACKGROUND

Customers are provided with numerous types of online services. However, maintaining a high level of reliability and uptime for the online services is difficult. These online services constantly face unplanned downtime and interruptions that impact accessibility for customers. When these outages occur, on-call engineers need to be alerted to these outages.

Unfortunately, the current alerting mechanisms are deficient. FIG. 1 illustrates a block diagram of example communications 100 associated with a conventional alerting mechanism. As illustrated, at step 110 the on-call engineer answers a telephone call. In response to the on-call engineer answering the call, at step 120 the alerting mechanism states "Hello this is Bob calling with an important message from ABC online services." Further, the alerting mechanism prompts the on-call engineer to "please unlock the keypad when necessary" at step 130. At step 140, the alerting mechanism then identifies information about the alert. Specifically, the alerting mechanism states "We have received an Alert ID: 94cd242a-92m5-2842-782482499a. The Alert was raised on Dec. 5, 2016. OnlineServicePingProbe Probe targeting w2.example01.expr01gw112 last failed at '12/5/ 2016 7:15:53 PM' with result name OnlineServicePingProb-Probe/example01/OSRR01DG112/OSRR01DF112-db116'." Further, the alerting mechanism prompts the on-call engineer to "please enter 1# to acknowledge this message" at step 150. The on-call engineer responds "1#" at step 160. However, if the on-call engineer wishes to learn more about the error impacting their service, they have no recourse but to manually exit the alerting session and perform manual service-specific investigation and remediation steps.

As illustrated above, the existing alerting mechanism merely informs the on-call engineer about an outage. Unfortunately, the existing alerting mechanism generates painstakingly long notification messages that include voluminous sequences of numbers and letters that frequently results in the on-call engineer summarily dismissing the notification before receiving the substance of the alert. While a significant portion of the information conveyed in the alert may be of some importance to the computing devices, the information provides the on-call engineer with limited information regarding the outage.

After receiving the alert from the alerting mechanism, the on-call engineer must then diagnose and remediate the issue outside of the alerting workflow. Frequently, this requires the on-call engineer to decipher the alert and investigate details about the issue in order to identify the relevant computing device and potential remediation actions.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects of systems and methods for providing an enhanced diagnostic and remediation system are discussed herein. The enhanced diagnostic and remediation system enables a user to monitor a computing system/framework for interruptions or other issues that impact the accessibility of the computing system/framework. When an interruption occurs at the monitored computing system/framework, the enhanced diagnostic and remediation system sends an alert communication to the user. In response, the user communicates with the enhanced diagnostic and remediation system to diagnose and remediate the interruption. Thus, the user is able to efficiently address the interruption that impacts accessibility of the computing system/framework.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
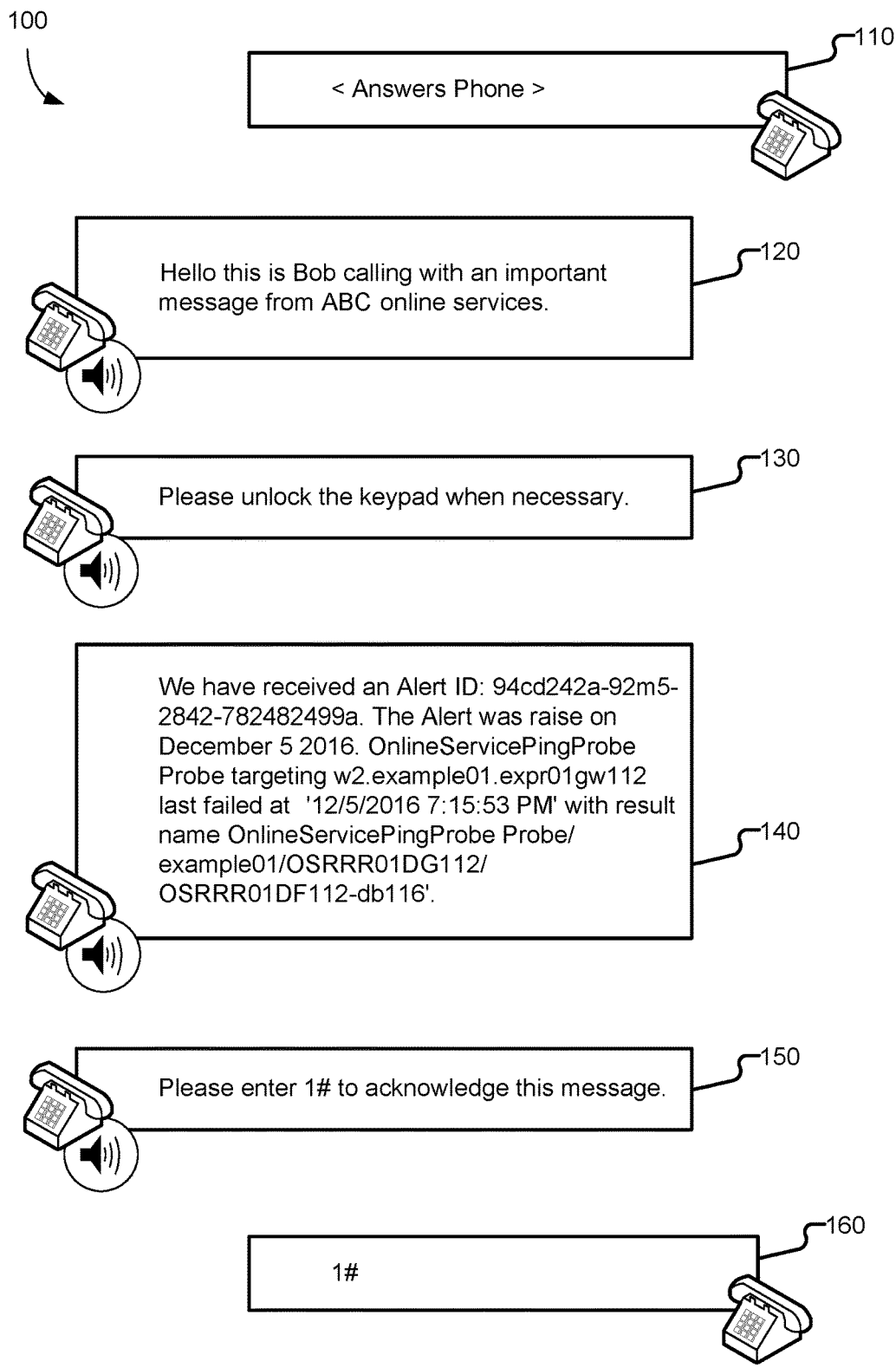
FIG. 1 is a block diagram of example communications associated with a conventional alerting mechanism.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 2:
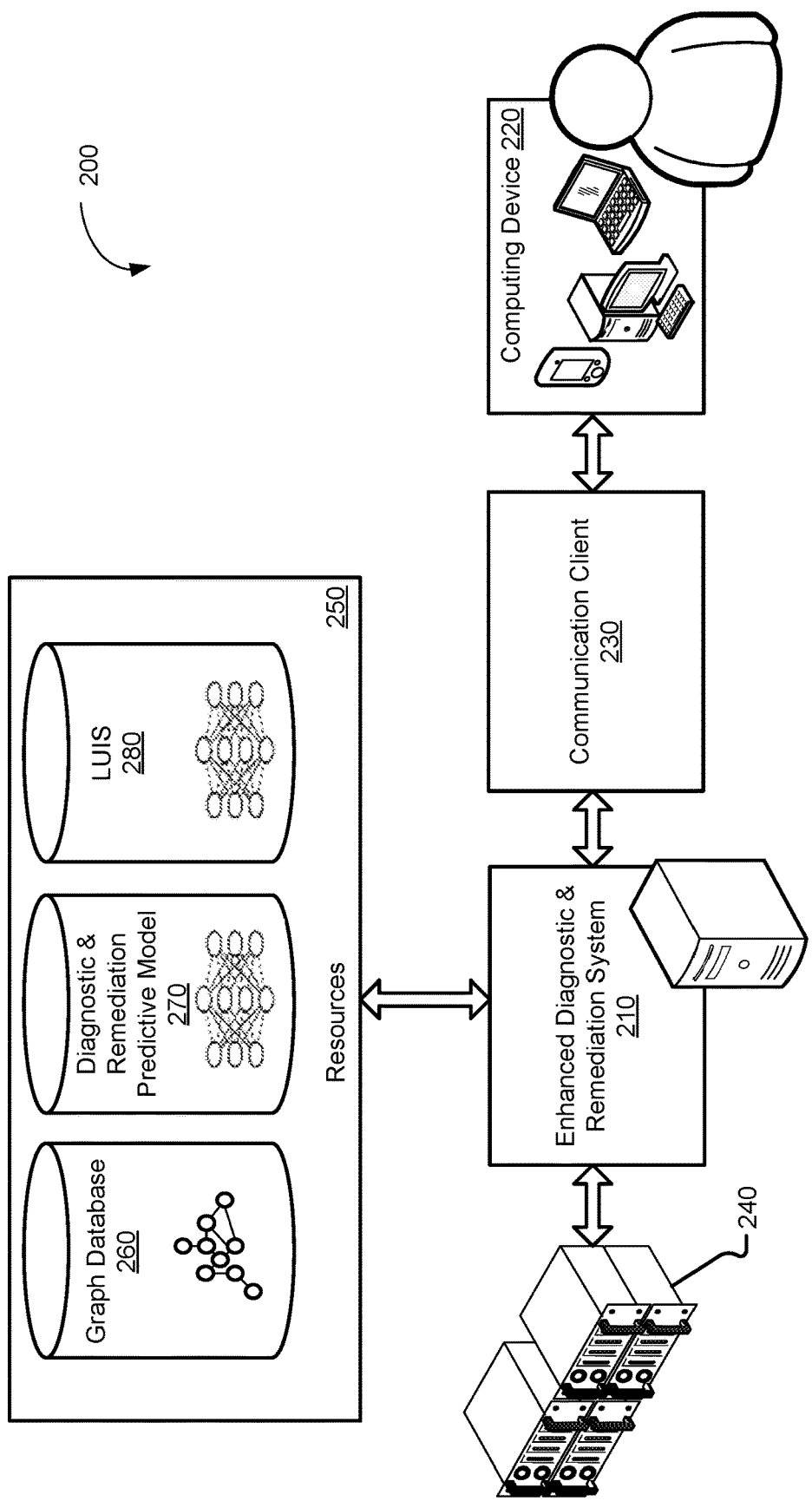
FIG. 2 is an example environment in which an enhanced diagnostic and remediation system is implemented.

FIG. 2 illustrates an example environment 200 in which an enhanced diagnostic and remediation system 210 is implemented. As illustrated, a computing device 220 interacts with a communication client 230 to communicate with the enhanced diagnostic and remediation system 210. The enhanced diagnostic and remediation system 210 enables the user to monitor a computing system/framework 240, which includes one or more machines, systems, framework, or services that are designated by a user for interruptions. As defined here, interruptions include, but are not limited to: errors, issues, failures, or any other problem that impacts accessibility of the computing system/framework 240. When an interruption occurs at the monitored computing system/framework 240, the enhanced diagnostic and remediation system 210 sends alert communications to the computing device 220 via the communication client 230. In response, the computing device 220 communicates with the enhanced diagnostic and remediation system 210, via the communication client 230, to diagnose and remediate the interruption with the computing system/framework 240.

The computing device 220 and monitored computing system/framework 240 are illustrative of a variety of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 6, 7A, 7B, and 8. In various aspects, the computing devices are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). Various intermediaries (e.g., networks and servers) may be interposed between the computing device 220, the communication client 230 and the enhanced diagnostic and remediation system 210 that facilitate the routing of communications.

In various aspects, the computing device 220 is configured for several types of communication via the communication client 230. According to one aspect, the computing device 220 is configured for voice-based communication via the communication client 230. The computing device 220 allows the user to send and receive messages via the communication client 230 including audio signals, such as speech or dual-tone multi-frequency tones. In various aspects, the audio signals are used as distinct inputs, while in other aspects the audio signals include natural language communication, which may or may not be converted to text before transmission to the enhanced diagnostic and remediation system 210. The computing device 220 is operable to receive commands and content from the user via a microphone or other sound producing device and to output messages received by the communication client 230 via speakers or other sound output devices.

According to another aspect, the computing device 220 is configured for message-based communication via the communication client 230. The message-based communications may be structured as natural language messages or as menu-driven messages. The communication client 230 is illustrative of any client associated with an application used to send and receive messages, including, without limitation, local applications and cloud-based applications, such as WHATSAPP® Messenger (offered by WhatsApp, Inc. of Mountain View, Calif.), FACEBOOK® Messenger (offered by Facebook, Inc. of Menlo Park, Calif.), GOOGLE CHAT™ (offered by Alphabet, Inc. of Mountain View, Calif.), YAHOO!® Messenger (offered by Yahoo, Inc. of Sunnyvale, Calif.), and SKYPE® (offered by Skype Technologies S.A.R.L. of Luxembourg City, Luxembourg). In additional aspects, the messaging application 115 is integrated or in communication with a social media platform, such as, FACEBOOK® (offered by Facebook, Inc.) or Linkedin™ (offered by Microsoft, Corp. of Redmond, Wash.), a communication application suite, such as SKYPE® for Business (offered by Microsoft, Corp.), or other messaging environment.

The enhanced diagnostic and remediation system 210 provides functionality to monitor, diagnose and remediate interruptions associated with the computing system/framework 240. More specifically, a user is able to interact with the enhanced diagnostic and remediation system 210, via the communication client 230, to send and receive communications relating to monitoring, diagnosing, and remediating interruptions incurred by the computing system/framework 240. According to one aspect, the enhanced diagnostic and remediation system 210 sends alerts to the computing device 220 when interruptions with the computing system/framework 240 are detected. According to another aspect, the enhanced diagnostic and remediation system 210 interacts with the user to provide diagnostic information regarding the interruption at the computing system/framework 240. According to yet another aspect, the enhanced diagnostic and remediation system 210 interacts with the user to receive remediation information for resolving the interruption at the computing system/framework 240.

The enhanced diagnostic and remediation system 210 may also utilize one or more resources 250 to provide the additional functionality relating to alert information, diagnostic information or remediation information. As illustrated, the one or more resources 250 include a graph database 260, a diagnostic and remediation predictive model 270, and a language understanding intelligence service 280. While the one or more resources 250 are shown remotely from the enhanced diagnostic and remediation system 210 for illustrative purposes, it should be noted that the one or more resources 250 are suitable for several configurations including, without limitation, a separate system hosted by the enhanced diagnostic and remediation system 210, an integral aspect of the enhanced diagnostic and remediation system 210, or as a remote part of the enhanced diagnostic and remediation system 210.

In one aspect, the enhanced diagnostic and remediation system 210 utilizes a language understanding intelligence service 280 to provide natural language processing for alerts, diagnostic information and/or remediation information. In one example, the language understanding intelligence service 280 is configured to utilize a natural language conversational model. The natural language conversational model is built and trained through a training model based on the computing system/framework 240, including information relating to a domain, a relevant service, a response group, historical alerts, remediation history, and other data relating to diagnosis and remediation. Further, the natural language conversational model is trained based on relevant intents in the language model (such as "escalate this alert to . . . " or "reboot machine . . . "). The training model refines the natural language conversational model using a machine learning approach that verifies its accuracy using the alert and diagnostic and remediation information as a training set to verify the accuracy of the natural language conversational model.

For example, in response to receiving a communication regarding an interruption, the language understanding intelligence service 280 parses the communication for relevant information regarding the interruption. The language understanding intelligence service 280 determines natural language conversational communications based on the relevant information. The enhanced diagnostic and remediation system 210 is operable to format the natural language conversational communications for presentation via the communication client 230. Using speech-to-text and text-to-speech functionality, the enhanced diagnostic and remediation system 210 provides and receives information and remediation actions for the interruption. In one example, the enhanced diagnostic and remediation system 210 utilizes a telephony framework to communicate via a phone call. In another example, the enhanced diagnostic and remediation system 210 utilizes a messaging framework to communicate via a message.

In another aspect, the enhanced diagnostic and remediation system 210 utilizes a diagnostic and remediation predictive model 270 to provide additional information to the user relating to diagnostic information and remediation information. For example, the enhanced diagnostic and remediation system 210 identifies an issue with the computing system/framework 240. In one example, the diagnostic and remediation predictive model 270 may be configured to provide information relating to the user's preferences for the type of information in the alert including, for example, content types, formatting, layout, etc. Further, it should be recognized that the diagnostic and remediation predictive model 270 is built and trained based on a training model that defines the alert preferences based on the observed patterns, including information relating to the user's profile data, the user's response group, the user's historical diagnosis, the remediation history, the user's contacts, the user's transfers of alerts to other person or response groups, as well as other data relating to diagnosis and remediation. The training model refines the diagnostic and remediation model using a machine learning approach that verifies its accuracy using the diagnostic and remediation information as a training set to verify the accuracy of the diagnostic and remediation models. In another example, the diagnostic and remediation predictive model 270 may be configured to provide diagnostic and remediation recommendations. More specifically, the diagnostic and remediation predictive model 270 is configured to utilize the observed patterns to generate one or more diagnostic and remediation recommendations. The diagnostic and remediation predictive model 270 is built and trained based on a training model that defines the diagnostic and remediation models based on the observed patterns and refines the diagnostic and remediation recommendations to verify accuracy.

Thus, the diagnostic and remediation predictive model 270 provides one or more predictive results, such as a diagnostic and remediation preferences and/or a diagnostic and remediation recommendations, in response to identifying an interruption. Further, the diagnostic and remediation predictive model 270 may provide results based on a weighted average. For example, in response to receiving a query, the diagnostic and remediation predictive model 270 may generate multiple predictions associated with the diagnostic and remediation recommendations. In response to generating multiple predictions, the diagnostic and remediation predictive model 270 may present the result as a weighted average. In another example, the diagnostic and remediation predictive model 270 provides a confidence score associated with the prediction based on the differences with the multiple predictions.

In yet another aspect, the enhanced diagnostic and remediation system 210 utilizes a graph database 260 to provide additional information to the user. For example, the graph database 260 provides one or more relational graphs with nodes describing entities and a set of accompanying properties of those entities, such as, for example, the names, titles, ages, addresses, etc. Each property can be considered a key/value pair—a name of the property and its value. In other examples, entities represented as nodes include persons, work groups, services, teams, machines, interruptions, etc., as well as edges representing relations among these entities, such as, for example, an edge between a person node and a machine node representing that person's involvement, remediation, or modification of the associated machine. Two persons who have interacted with the same machine, as in the above example, will be connected by one "hop" via that machine with the other person, as each person's node shares an edge with the machine's node. The graph database 260 executes graph queries that are submitted by various users to return nodes or edges that satisfy various conditions (e.g., users within the same service or work group of a company, the last X interruptions accessed by a given user). In various aspects, the graph database 260 is in communication with the alert databases and remediation services to match actions to interruptions and track edges between nodes representing remediation.

According to another aspect, the enhanced diagnostic and remediation system 210 receives instructions to remediate issues with the computing system/framework 240. The instructions sent to the enhanced diagnostic and remediation system 210 may be structured as natural language messages or as menu-driven messages. For example, a user transmits an instruction as a sentence, phrase, or set of keywords in a natural language message. The enhanced diagnostic and remediation system 210 parses the message based on grammatical structure and content to determine the command and object of the command. In another example, a user activates the enhanced diagnostic and remediation system 210 via the communication client 230, which returns a menu interface including operands associated with options for commands and objects for the user to pick from. When the enhanced diagnostic and remediation system 210 receives a response after transmitting the menu interface, it will parse the subsequent message from the user for operands identifying an option from a presented menu.

When the enhanced diagnostic and remediation system 210 needs additional information to identify commands and objects thereof from the message, a clarification message is sent to the communication client 230 for display to the user. In some aspects, a clarification message is transmitted in response to a message that has been correctly identified by the enhanced diagnostic and remediation system 210, but initiates a menu-driven communication. For example, a user first activates the enhanced diagnostic and remediation system 210 by sending a natural language message to which the enhanced diagnostic and remediation system 210 responds by providing a top-level of a menu interface. In another example, in response to receiving an operand identifying an option from a menu interface, the enhanced diagnostic and remediation system 210 responds by providing a sub-menu based on the operand received from the user. In a further example, when the enhanced diagnostic and remediation system 210 cannot map a natural language message or a menu-driven message from the user to a command and/or object, the enhanced diagnostic and remediation system 210 will provide a response asking the user to resubmit the message (e.g., "I am sorry, but I did not understand you. Please try again."). As will be appreciated, a messaging session between a user and the enhanced diagnostic and remediation system 210 may include several rounds of clarification messages and may switch back and forth between using natural language messages and menu-driven messages.

Figure 3:
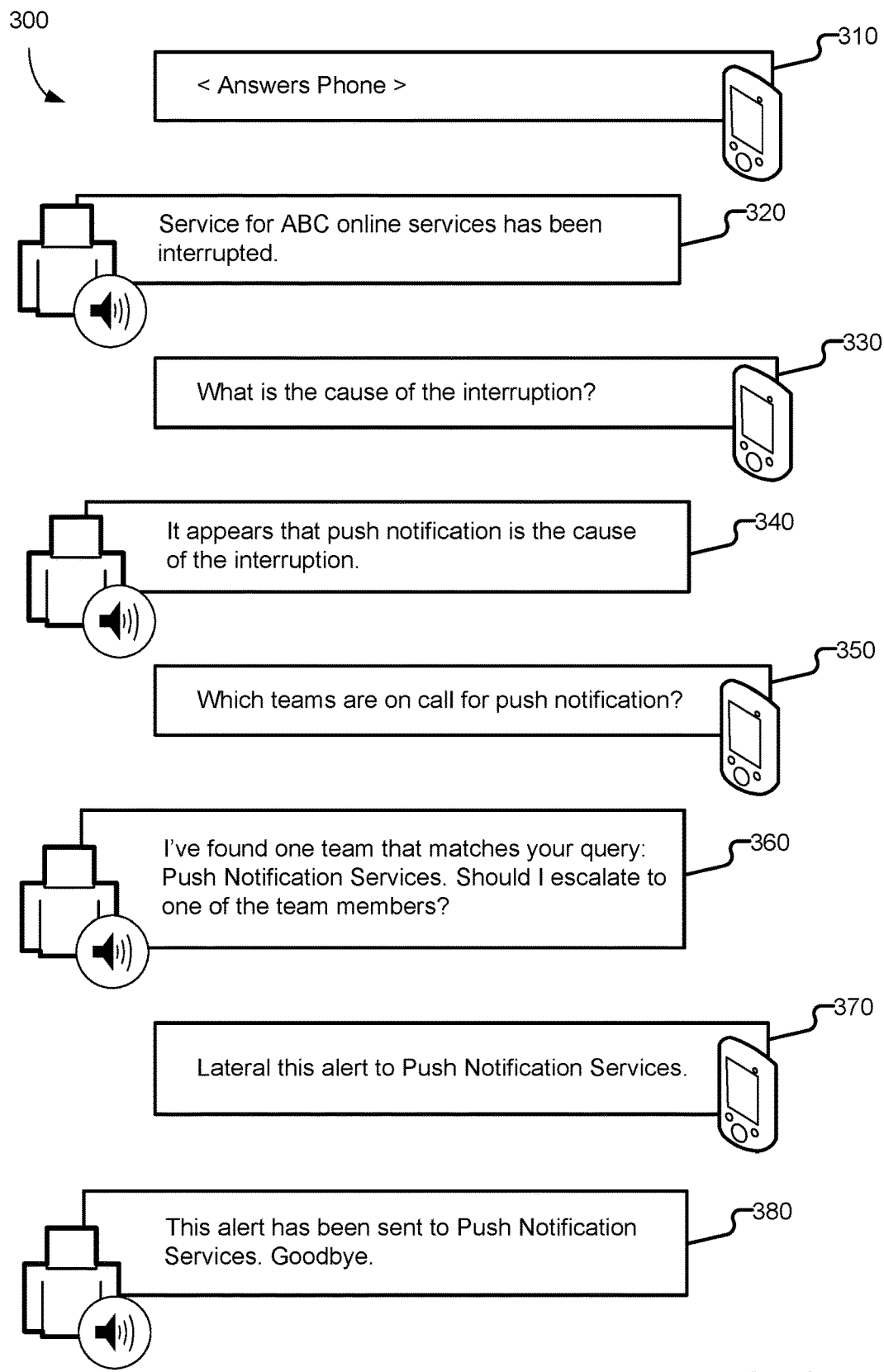
FIG. 3 is a block diagram of example communications associated with the enhanced diagnostic and remediation system.

FIG. 3 is a block diagram of example communications 300 associated with the enhanced diagnostic and remediation system 210. The enhanced diagnostic and remediation system 210 utilizes various resources for interacting with the user, including the diagnostic and remediation predictive model 270 and the language understanding intelligence service 280.

The example communications begin at communication 310, where the user answers a telephone call. In response, the example communications proceed to communication 320, where the enhanced diagnostic and remediation system 210 communicates an alert regarding the computing system/framework 240. More particularly, in the illustrated example, the enhanced diagnostic and remediation system 210 communicates that "Service for ABC online services has been interrupted."

At communication 330, the user requests diagnosis information regarding the alert. More particularly, in the illustrated example, the user inquires "What is the cause of the interruption?"

In response, the example communications proceed to communication 340, where the enhanced diagnostic and remediation system 210 responds to the user's request for additional information. More particularly, in the illustrated example, the enhanced diagnostic and remediation system 210 communicates that "It appears that push notification is the cause of the interruption."

At communication 350, the user requests remediation information regarding the alert. More particularly, in the illustrated example, the user inquires "Which teams are on call for push notifications?"

In response, the example communications proceed to communication 360, where the enhanced diagnostic and remediation system 210 communicates remediation information regarding the alert. More particularly, in the illustrated example, the enhanced diagnostic and remediation system 210 communicates that "I've found one team that matches your query: Push Notification Services. Should I escalate to one of the team members?"

At communication 370, the user provides remediation instructions to the enhanced diagnostic and remediation system 210. More particularly, in the illustrated example, the user instructs the enhanced diagnostic and remediation system 210 to "Lateral this alert to Push Notification Services."

The example communications proceed to communication 380, where the enhanced diagnostic and remediation system 210 acknowledges the remediation instructions. More particularly, in the illustrated example, the enhanced diagnostic and remediation system 210 communicates that "This alert has been sent to Push Notification Services. Goodbye."

Figure 4:
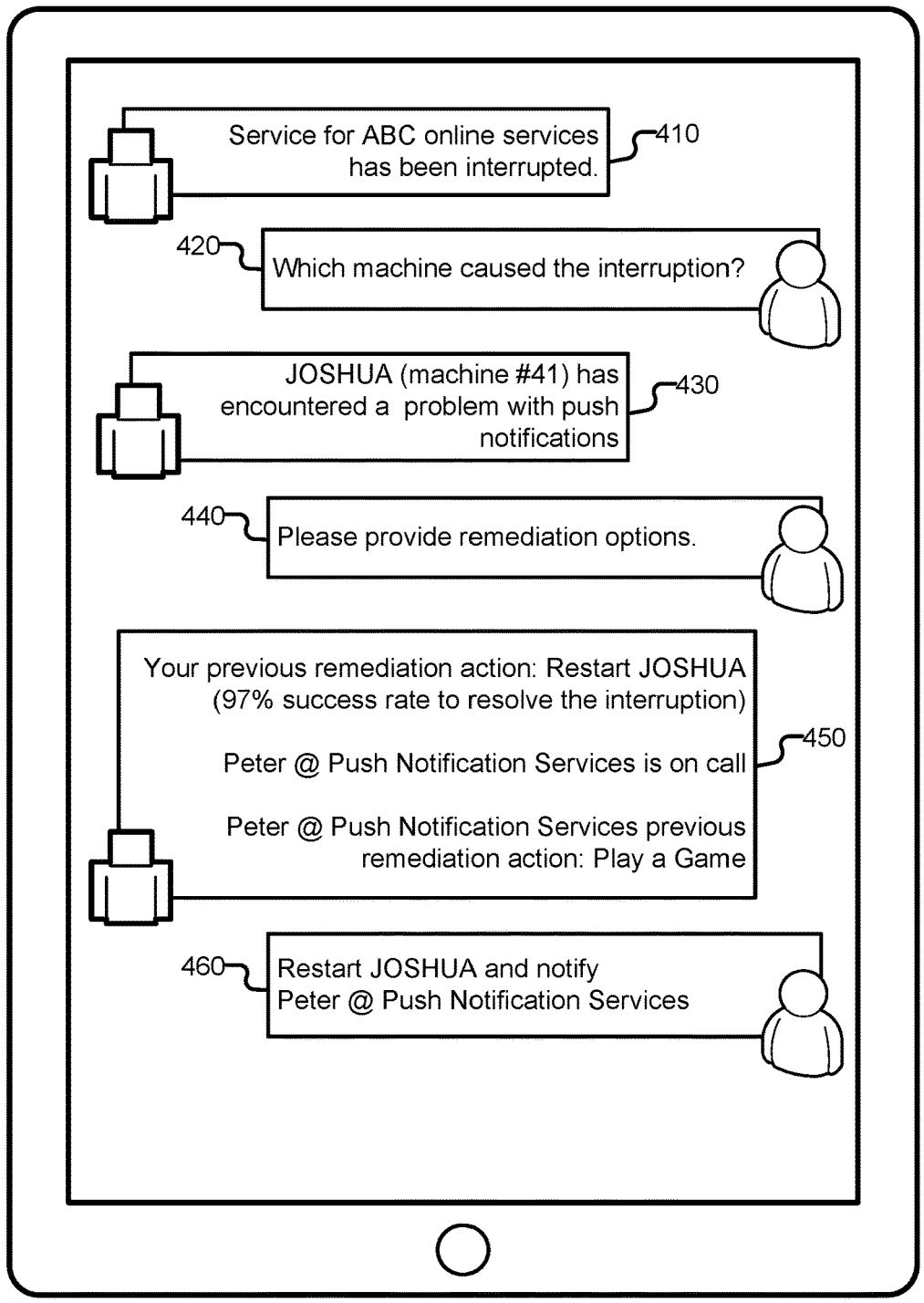
FIG. 4 is a block diagram of example communications associated with the enhanced diagnostic and remediation system.

FIG. 4 is a block diagram of example communications associated with the enhanced diagnostic and remediation system. More particularly, the example communications are displayed on a computing device 220. The enhanced diagnostic and remediation system 210 utilizes various resources for interacting with the user, including the graph database 260, the diagnostic and remediation predictive model 270, and the language understanding intelligence service 280.

The example communications begin at communication 410, where the enhanced diagnostic and remediation system 210 communicates an alert regarding the computing system/framework 240. More particularly, in the illustrated example, the enhanced diagnostic and remediation system 210 communicates that "Service for ABC online services has been interrupted."

At communication 420, the user requests diagnosis information regarding the alert. More particularly, in the illustrated example, the user inquires "Which machine caused the interruption?"

In response, the example communications proceed to communication 430, where the enhanced diagnostic and remediation system 210 responds to the user's request for additional information. More particularly, in the illustrated example, the enhanced diagnostic and remediation system 210 communicates that "JOSHUA (machine #41) has encountered a problem with push notifications."

At communication 440, the user requests remediation information regarding the alert. More particularly, in the illustrated example, the user inquires "Please provide remediation options."

In response, the example communications proceed to communication 450, where the enhanced diagnostic and remediation system 210 communicates remediation information regarding the alert. More particularly, in the illustrated example, the enhanced diagnostic and remediation system 210 communicates that "Your previous remediation action: Restart JOSHUA (97% success rate to resolve the interruption)," "Peter @ Push Notification Services is on call" and "Peter @ Push Notification Services previous remediation action: Play a Game."

At communication 460, the user provides remediation instructions to the enhanced diagnostic and remediation system 210. More particularly, in the illustrated example, the user instructs the enhanced diagnostic and remediation system 210 to "Restart JOSHUA and notify Peter @ Push Notification Services."

Figure 5:
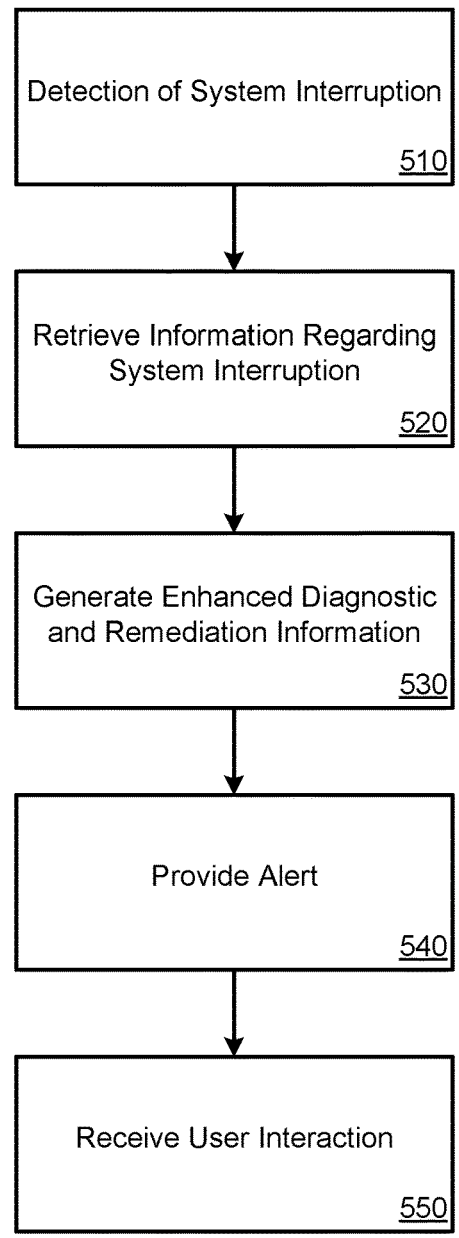
FIG. 5 is a flow chart showing general stages involved in an example method for providing enhanced diagnostic and remediation services.

FIG. 5 is a flow chart showing general stages involved in an example method for providing enhanced diagnostic and remediation services.

Method 500 begins at OPERATION 510, where the enhanced diagnostic and remediation system 210 detects a system interruption. These interruptions include, but are not limited to: errors, issues, failures, or any other problem that impacts accessibility of the computing system/framework 240.

Method 500 proceeds to OPERATION 520, where the enhanced diagnostic and remediation system 210 retrieves information regarding system interruption. In one example, the enhanced diagnostic and remediation system 210 receives a notification from the computing system/framework 240 regarding an interruption. In response, the language understanding intelligence service 280 parses the notification for relevant information. In another example, the enhanced diagnostic and remediation system 210 retrieves various information regarding the computing system/framework 240, including, but not limited to, machine information, interruption information, or other information that is helpful to convey information regarding the interruption.

Method 500 proceeds to OPERATION 530, where the enhanced diagnostic and remediation system 210 generates enhanced diagnostic and remediation information. According to one aspect, the enhanced diagnostic and remediation information includes a rich description of the system interruption. For example, the rich description of the system interruption may identify the information regarding the type of service, machine information, and/or other information regarding the interruption. According to one aspect, the enhanced diagnostic and remediation information includes generating candidate remediation actions for remediation of the system interruption. The candidate remediation actions may include identification of actions to address the interruption, identification of service groups, and/or identification of on-call users. Further, the remediation actions are ranked by the likelihood of the success of each of the candidate remediation actions. In one example, the remediation actions are based on a user's previous remediation actions. In another example, the remediation actions are based on standard remediation actions.

Method 500 proceeds to OPERATION 540, where the enhanced diagnostic and remediation system 210 provides the alert based on enhanced diagnostic and remediation information. According to one aspect, the enhanced diagnostic and remediation system 210 generates an alert that identifies the information regarding the type of service, machine information, and/or other information regarding the interruption. For example, the alert may identify a specific service or a specific machine. According to another aspect, the enhanced diagnostic and remediation system 210 generates an alert that identifies the candidate remediation actions.

Method 500 proceeds to OPERATION 550, where the enhanced diagnostic and remediation system 210 receives a user interaction. According to one aspect, the user may request additional information that relates to diagnostic information. For example, the user may request additional information regarding the particular machine or service. According to another aspect, the user may request additional information that relates to remediation information. For example, the user may request information regarding previous remediation actions, associated service groups, on-call technicians, and an actions likelihood of success in resolving the interruption. According to another aspect, the user may provide instructions for remediating the interruption. In one example, the user may direct the alert to a particular service group. In one example, the user may initiate a remediation action to resolve the interruption.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
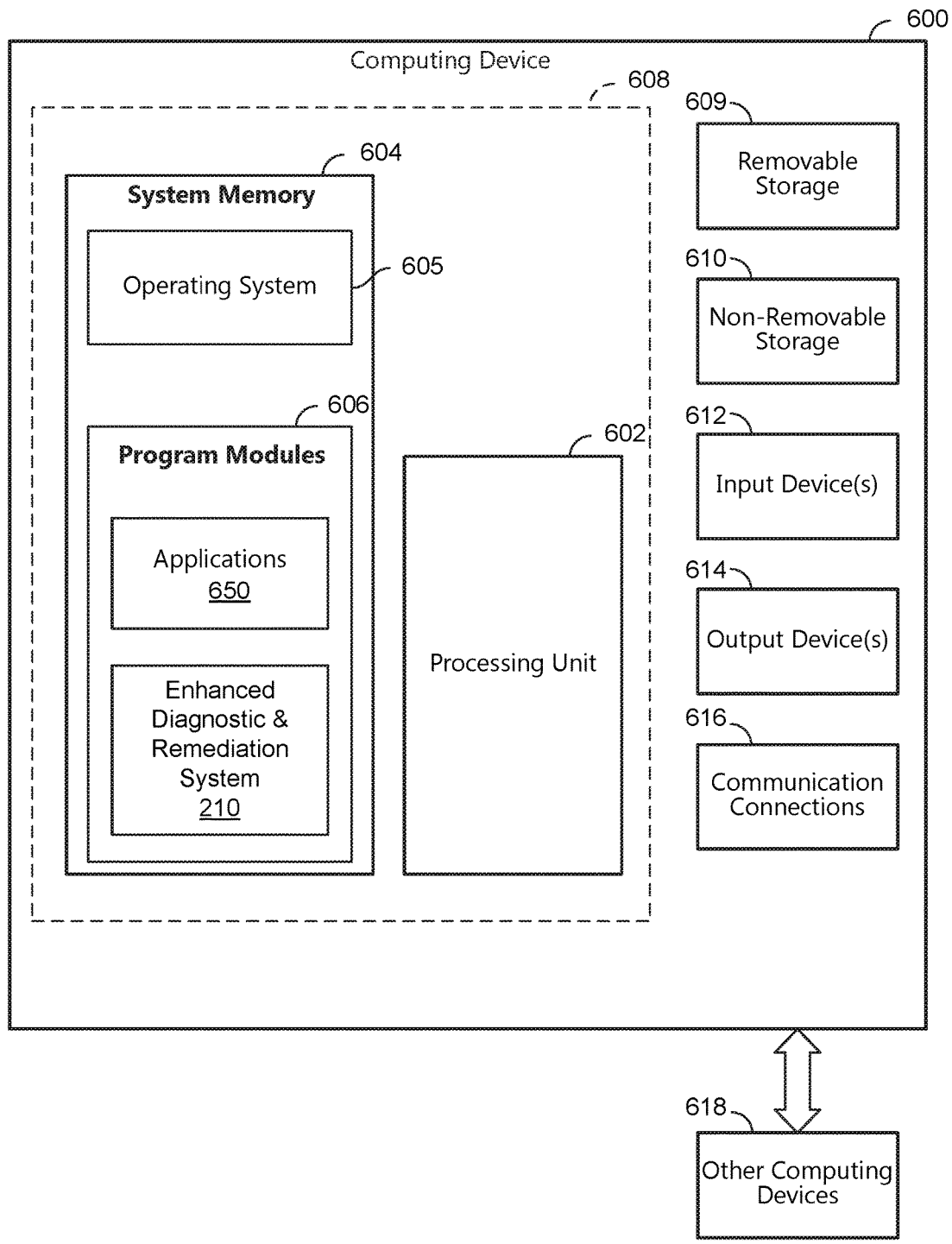
FIG. 6 is a block diagram illustrating example physical components of a computing device.
Figure 7A:
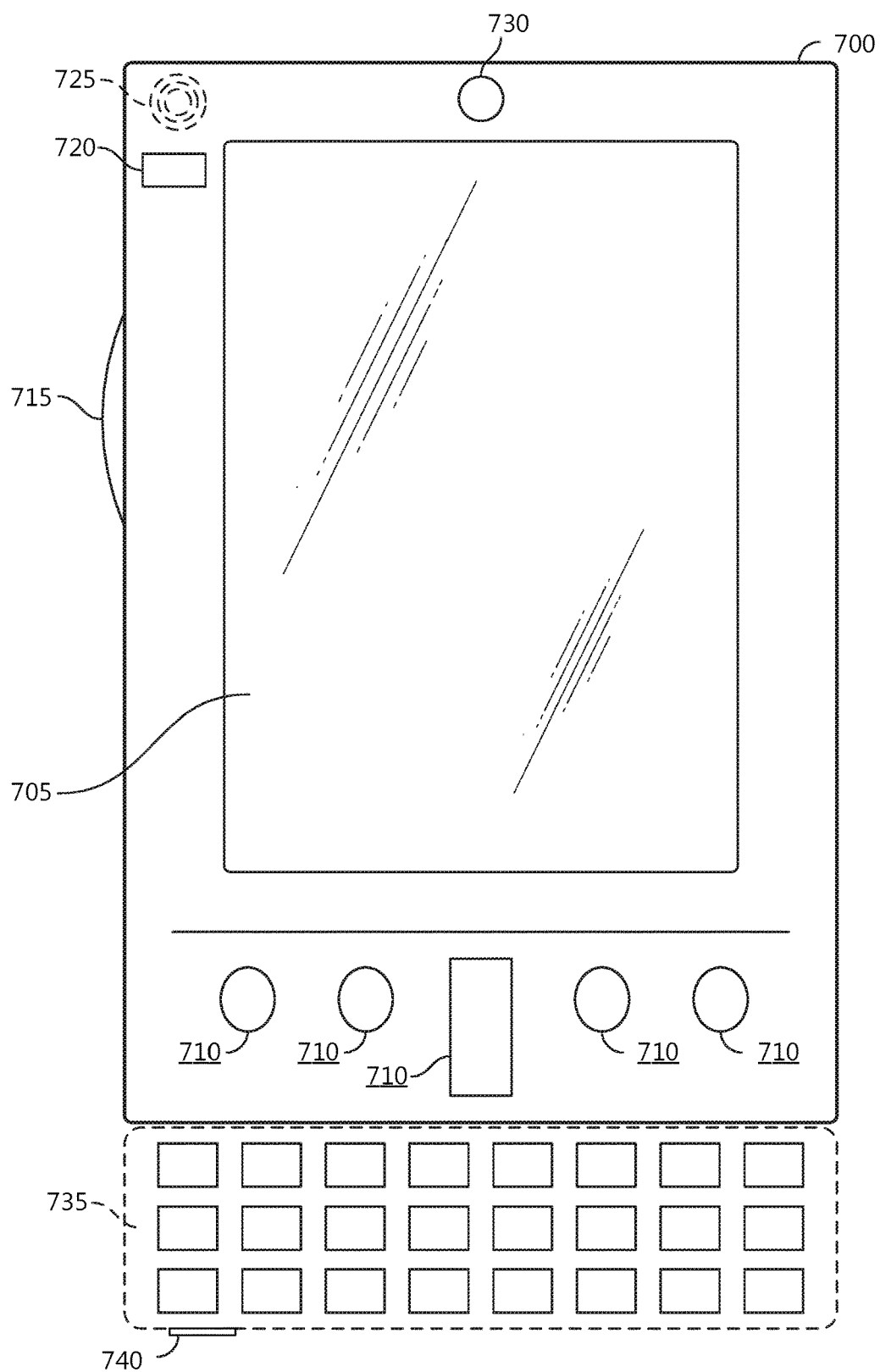
FIGS. 7A and 7B are block diagrams of a mobile computing device.
Figure 7B:
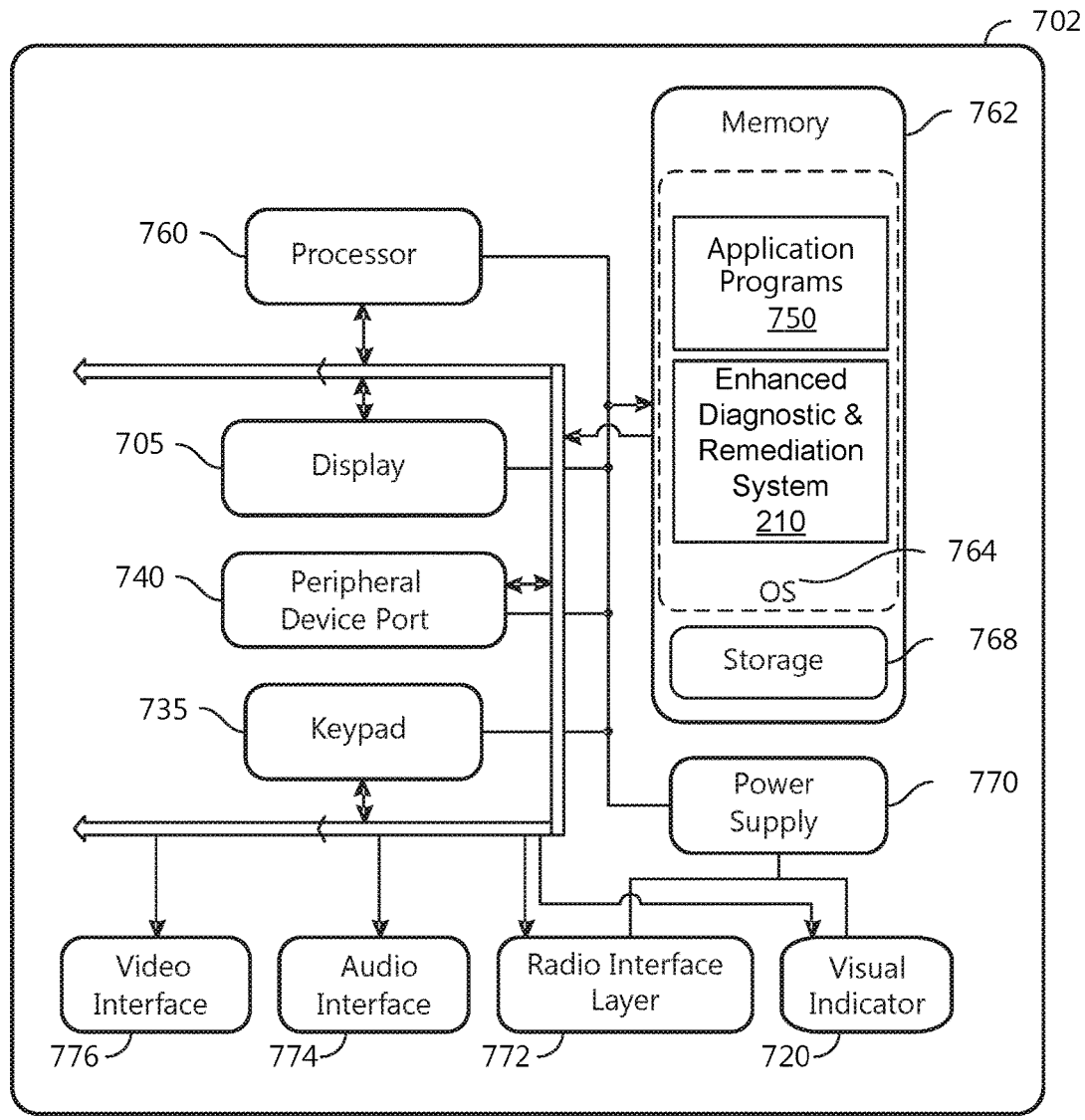
Figure 8:
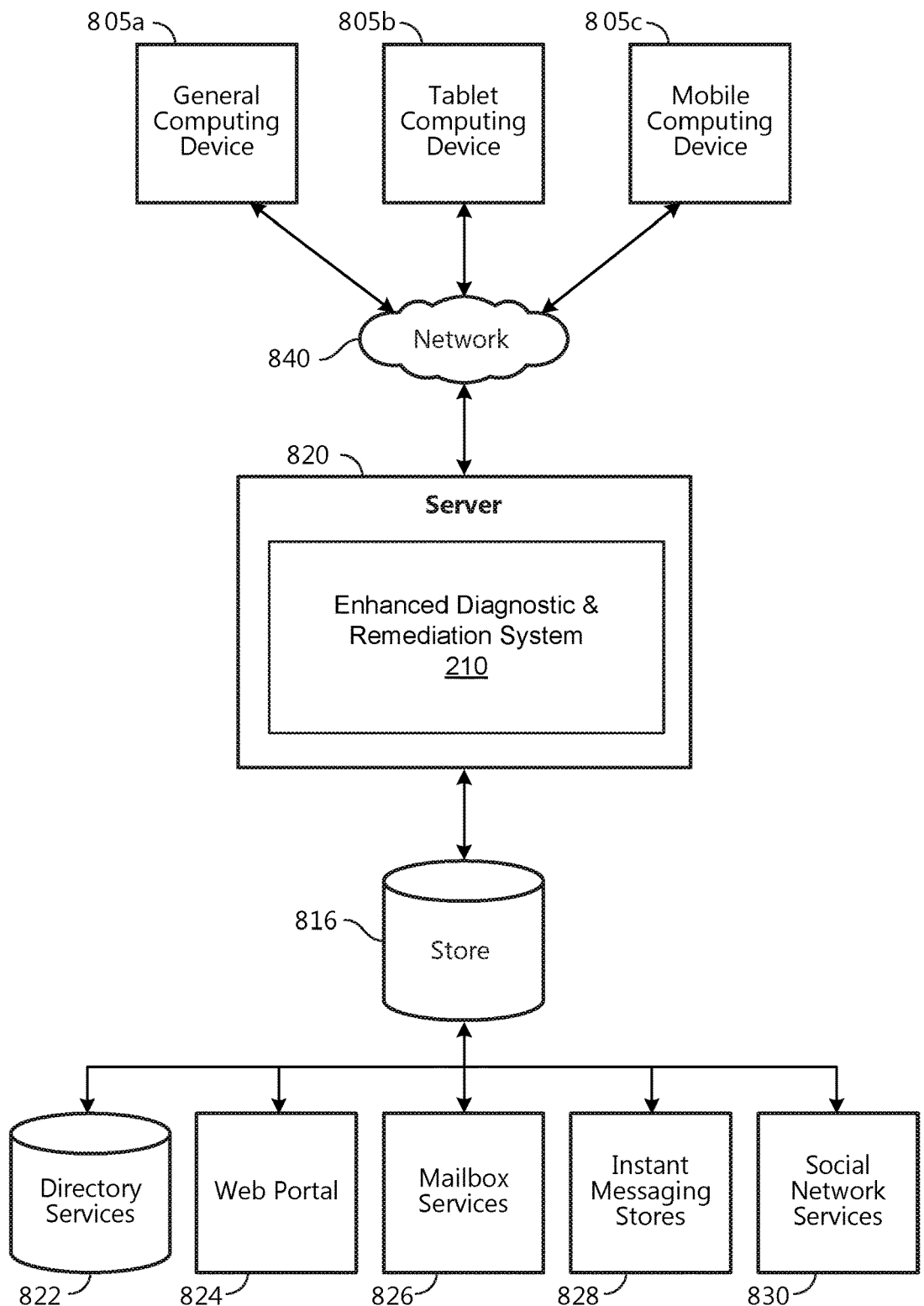
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the enhanced diagnostic and remediation system 210. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., enhanced diagnostic and remediation system 210) perform processes including, but not limited to, one or more of the stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the enhanced diagnostic and remediation system 210 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for providing enhanced diagnostic and remediation as described above. Content developed, interacted with, or edited in association with the enhanced diagnostic and remediation system 210 is enabled to be stored in different communication channels or other storage types. For example, various documents may be stored using a directory service 822, a web portal 824, a mailbox service 826, an instant messaging store 828, or a social networking site 830. The enhanced diagnostic and remediation system 210 is operative to use any of these types of systems or the like for providing enhanced diagnostic and remediation, as described herein. According to an aspect, a server 820 provides the enhanced diagnostic and remediation system 210 to clients 805a,b,c. As one example, the server 820 is a web server providing the enhanced diagnostic and remediation system 210 over the web. The server 820 provides the enhanced diagnostic and remediation system 210 over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for providing diagnostic and remediation services, comprising:
    detecting a system interruption associated with a computing device and at least one computing system;
    retrieving information regarding the system interruption associated with the computing device and the at least one computing system;
    providing an alert to a user, the alert related to the system interruption;
    receiving a spoken query related to the system interruption from the user;

converting the spoken query to text using speech recognition;
parsing the text using a language understanding intelligence service;
generating a diagnostic and remediation response based on the spoken query, wherein the response is based on at least one response group and the language understanding intelligence service trained on at least one model based on the at least one computing system; and
sending the response to the user.

2. The method of claim 1, wherein generating the diagnostic and remediation response further includes generating a rich description of the system interruption.

3. The method of claim 1, wherein generating the diagnostic and remediation response further includes generating candidate remediation actions for remediation of the system interruption.

4. The method of claim 3, wherein the candidate remediation actions are ranked by likelihood of success.

5. The method of claim 3, wherein the candidate remediation actions are based on at least one previous remediation action of the user.

6. The method of claim 3, wherein the candidate remediation actions are generated based on standard remediation actions.

7. The method of claim 3, wherein the alert further includes the candidate remediation actions.

8. The method of claim 1, further comprising receiving a selection of a remediation action.

9. The method of claim 1, wherein the alert identifies a specific service alert.

10. A system for providing diagnostic and remediation services, comprising:
a processing unit; and
a memory including computer readable instructions, which when executed by the processing unit, causes the system to be operable to:
detect a system interruption associated with a computing device and at least one computing system;
retrieve information regarding the system interruption associated with the computing device and the at least one computing system;
provide an alert to a user, the alert related to the system interruption;
receive a spoken query related to the system interruption from the user;
convert the spoken query to text using speech recognition;
parse the text using a language understanding intelligence service;
generate a diagnostic and remediation response based on the spoken query, including a rich description of the system interruption and candidate remediation actions for remediation of the system interruption, wherein the response is based on at least one response group and the language understanding intelligence service and at least one remediation predictive model; and
send the response to the user.

11. The system of claim 10, wherein the candidate remediation actions are ranked by likelihood of success.

12. The system of claim 10, wherein the candidate remediation actions are based on at least one previous remediation action of the user.

13. The system of claim 10, wherein the candidate remediation actions are generated based on standard remediation actions.

14. The system of claim 10, wherein the alert further includes the candidate remediation actions.

15. The system of claim 10, wherein the system is further operable to receive a selection of one of the candidate remediation actions.

16. The system of claim 10, wherein the alert identifies a specific service alert.

17. A computer readable storage device including computer readable instructions, which when executed by a processing unit, performs steps for providing diagnostic and remediation services, comprising:
detecting a system interruption associated with a computing device and at least one computing system;
retrieving information regarding the system interruption associated with the computing device and the at least one computing system;
providing an alert to a user, the alert related to the system interruption;
receiving a spoken query related to the system interruption from the user;
converting the spoken query to text using speech recognition;
parsing the text using a language understanding intelligence service;
generating a diagnostic and remediation response based on the spoken query, including a rich description of the system interruption and candidate remediation actions for remediation of the system interruption, wherein the response is based on at least one response group and the language understanding intelligence service and at least one graph database; and
sending the response to the user.

18. The computer readable storage device of claim 17, wherein the candidate remediation actions are ranked by likelihood of success.

19. The computer readable storage device of claim 17, wherein the candidate remediation actions are based on at least one previous remediation action of the user.

20. The computer readable storage device of claim 17, wherein the candidate remediation actions are generated based on standard remediation actions.

* * * * *